US009311505B2

(12) United States Patent
Sathish et al.

(10) Patent No.: US 9,311,505 B2
(45) Date of Patent: Apr. 12, 2016

(54) METHOD AND APPARATUS FOR PROVIDING ABSTRACTED USER MODELS

(75) Inventors: Sailesh Kumar Sathish, Tampere (FI); Jari Pekka Hämäläinen, Kangasala As (FI); Olivier Dousse, Lausanne (CH); Juha Kalevi Laurila, St-Legier (CH)

(73) Assignee: Noka Technologies Oy, Espoo (FI)

( * ) Notice: Subject to any disclaimer, the term of this patent is extended or adjusted under 35 U.S.C. 154(b) by 168 days.

(21) Appl. No.: 13/240,304

(22) Filed: Sep. 22, 2011

(65) Prior Publication Data

US 2013/0081099 A1   Mar. 28, 2013

(51) Int. Cl.
*G06F 21/62*   (2013.01)
(52) U.S. Cl.
CPC .................................. *G06F 21/6245* (2013.01)
(58) Field of Classification Search
None
See application file for complete search history.

(56) References Cited

U.S. PATENT DOCUMENTS

| | | | | |
|---|---|---|---|---|
| 7,672,952 | B2 * | 3/2010 | Isaacson et al. | 707/999.01 |
| 7,783,622 | B1 * | 8/2010 | Vandermolen et al. | 707/708 |
| 8,032,126 | B2 | 10/2011 | Fraccaroli | |
| 2004/0034652 | A1 * | 2/2004 | Hofmann et al. | 707/102 |
| 2007/0005419 | A1 * | 1/2007 | Horvitz et al. | 705/14 |
| 2009/0210475 | A1 * | 8/2009 | Gadanho et al. | 709/201 |
| 2009/0299945 | A1 * | 12/2009 | Hangartner | 706/50 |
| 2010/0088344 | A1 * | 4/2010 | Treat et al. | 707/794 |
| 2010/0235313 | A1 * | 9/2010 | Rea et al. | 706/52 |
| 2010/0235877 | A1 * | 9/2010 | Hu et al. | 726/1 |
| 2011/0035379 | A1 | 2/2011 | Chen et al. | |
| 2011/0136542 | A1 | 6/2011 | Sathish | |

OTHER PUBLICATIONS

Popescu, Andrei, Geolocation API Specification, W3C, http://dev.w3.org/geo/api/spec-source.html, pp. 1-14.
Recommender system, Wikipedia, http://en.wikipedia.org/wiki/Recommendation_systems, pp. 1-8.
Notification of Transmittal of The International Search Report and The Written Opinion of the International Searching Authority, or The Declaration for International Application No. PCT/FI2012/050827, dated Feb. 4, 2013.
Wikipedia, "Latent Dirichlet Allocation," web page, Sep. 17, 2011, pp. 1-6, http://en.wikipedia.org/w/index.php?title=Latent_dirichlet_allocation&oldid=450944748>.

* cited by examiner

*Primary Examiner* — Lisa Lewis
*Assistant Examiner* — Henry Tsang
(74) *Attorney, Agent, or Firm* — Ditthavong & Steiner, P.C.

(57) ABSTRACT

An approach is provided for providing abstracted user models in accordance with one or more access policies. A model platform determines an ontology for specifying a hierarchy of one or more abstraction levels for items data used in latent factorization models. The model platform further causes, at least in part, a generation of one or more user models for the one or more abstraction levels. The model platform also causes, at least in part, a selection of at least one of the one or more user models for generating one or more recommendations for one or more applications, one or more services, or a combination thereof based, at least in part, on one or more privacy policies, one or more security policies, or a combination thereof.

18 Claims, 12 Drawing Sheets

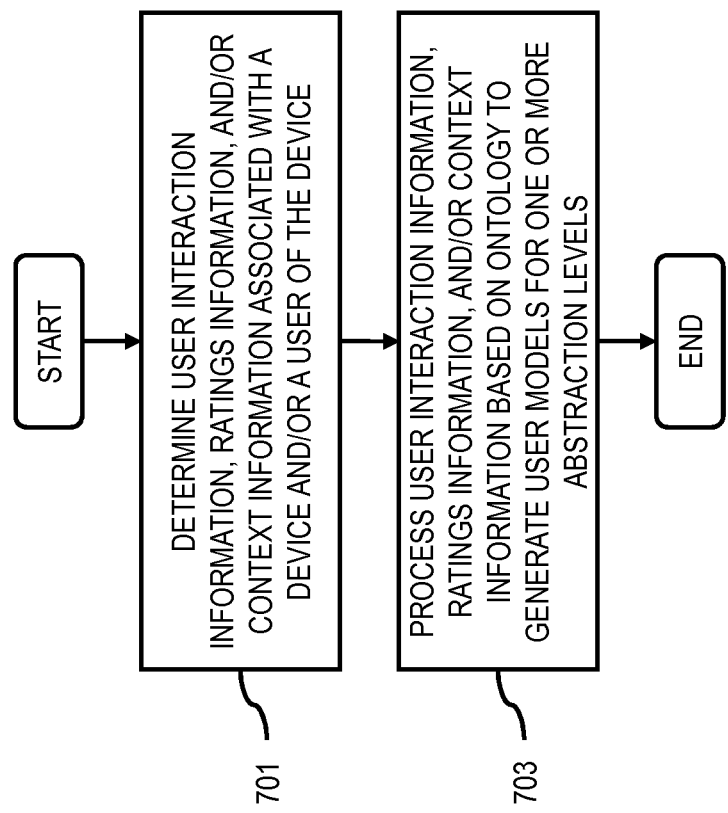

METHOD AND APPARATUS FOR PROVIDING ABSTRACTED USER MODELS

BACKGROUND

Service providers and device manufacturers (e.g., wireless, cellular, etc.) are continually challenged to deliver value and convenience to consumers by, for example, providing compelling network services. One area of interest has been providing personalized user experiences, for instance, to mobile device users. To provide personalized user experiences, there are services that gather data (e.g., user interaction information, ratings data, context information, and the like) from users and/or user devices and provide the personalized experiences based on the data. However, a problem exists regarding the amount of information (e.g., data) associated with a user that is shared to the services for providing personalized user experiences. For example, users may wish to not have all of their information shared to such services for privacy and/or security reasons. Therefore, service providers and device manufacturers face significant challenges associated with providing personalized user experiences while acknowledging privacy and/or security concerns associated with the user data.

SOME EXAMPLE EMBODIMENTS

Therefore, there is a need for an approach for providing abstracted user models in accordance with access policies.

According to one embodiment, a method comprises determining an ontology for specifying a hierarchy of one or more abstraction levels for items data used in latent factorization models. The method also comprises causing, at least in part, a generation of one or more user models for the one or more abstraction levels. The method further comprises causing, at least in part, a selection of at least one of the one or more user models for generating one or more recommendations for one or more applications, one or more services, or a combination thereof based, at least in part, on one or more privacy policies, one or more security policies, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine an ontology for specifying a hierarchy of one or more abstraction levels for items data for use in latent factorization models. The apparatus is also caused to generate one or more user models for the one or more abstraction levels. The apparatus is further caused to select at least one of the one or more user models for generating one or more recommendations for one or more applications, one or more services, or a combination thereof based, at least in part, on one or more privacy policies, one or more security policies, or a combination thereof.

According to another embodiment, a computer-readable storage medium carries one or more sequences of one or more instructions which, when executed by one or more processors, cause, at least in part, an apparatus to determine an ontology for specifying a hierarchy of one or more abstraction levels for items data used in latent factorization models. The apparatus is also caused to generate one or more user models for the one or more abstraction levels. The apparatus is further caused to select at least one of the one or more user models for generating one or more recommendations for one or more applications, one or more services, or a combination thereof based, at least in part, on one or more privacy policies, one or more security policies, or a combination thereof.

According to another embodiment, an apparatus comprises means for determining an ontology for specifying a hierarchy of one or more abstraction levels for items data used in latent factorization models. The apparatus also comprises means for causing, at least in part, a generation of one or more user models for the one or more abstraction levels. The apparatus further comprises means for causing, at least in part, a selection of at least one of the one or more user models for generating one or more recommendations for one or more applications, one or more services, or a combination thereof based, at least in part, on one or more privacy policies, one or more security policies, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable. An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a flowchart of a process for collecting information used to generate one or more user models, according to one embodiment;

DESCRIPTION OF SOME EMBODIMENTS

Examples of a method, apparatus, and computer program for providing abstracted user models in accordance with one or more access policies are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
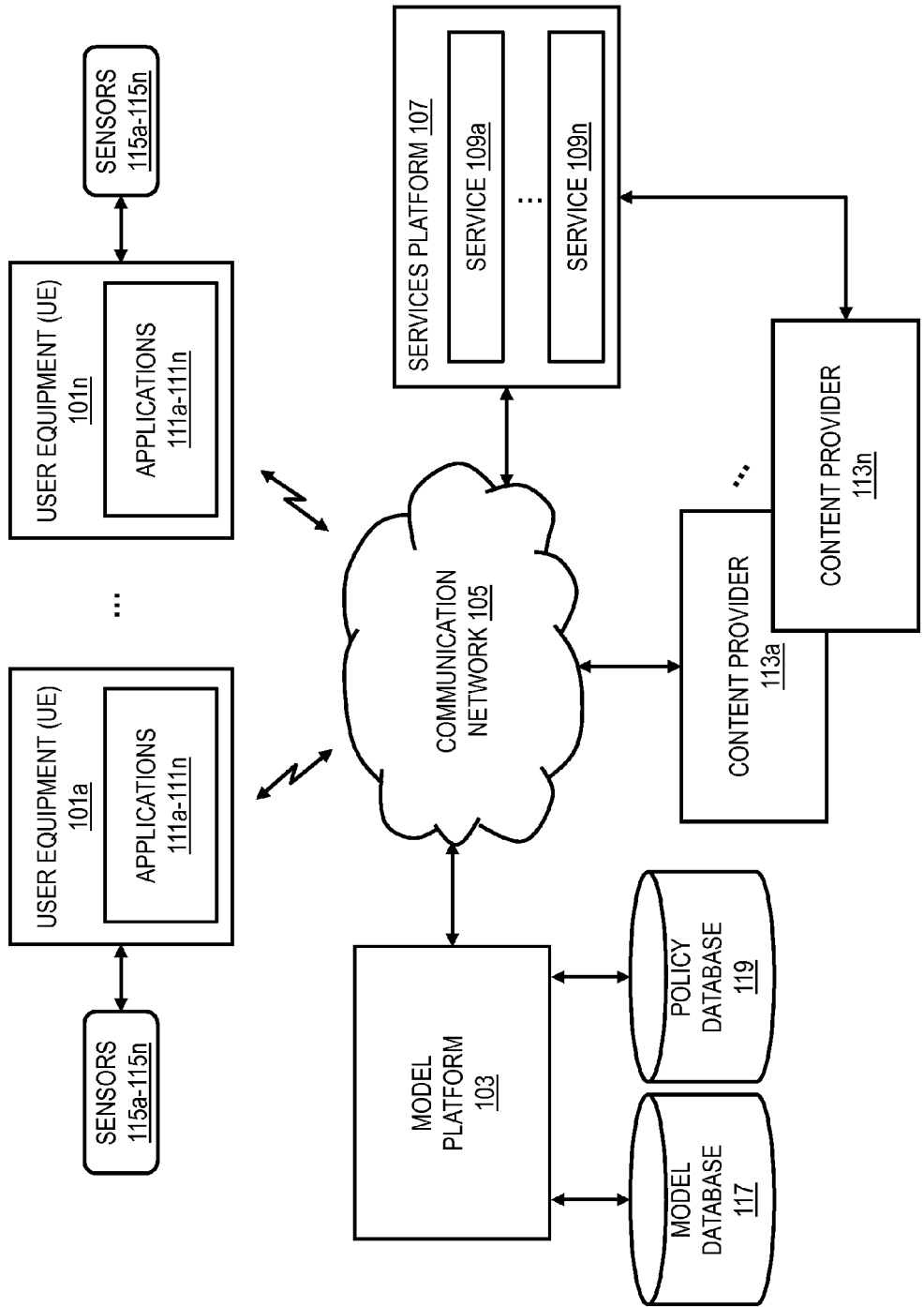
FIG. 1 is a diagram of a system capable of providing abstracted user models in accordance with one or more access policies, according to one embodiment.

FIG. 1 is a diagram of a system capable of providing one or more user models for generating one or more recommendations in accordance with one or more privacy and/or security policies, according to one embodiment. As discussed above, service providers and device manufacturers have been providing personalized user experiences to users based on user data (e.g., user interaction information, ratings data, context information, and the like). To provide such personalized user experiences, user models are generated based on the user data. Juxtaposed against the desire to provide personalized user experiences is the need to keep the user data that is used to generate the personalized experiences secure and private. For example, generating a user model based on all the possible user data and providing the user model to an outside service effectively provides the service with a large amount of information regarding the user, some of which may be considered personal and/or private. While the amount of data and/or the type of data that is collected may be controlled to minimize privacy and/or security concerns, controlling the amount and/or type of user data that is collected may negatively affect the personalization of the experiences and may unnecessarily limit the data where there are no privacy and security concerns regarding an application and/or service using the data.

To address this problem, a system 100 of FIG. 1 introduces the capability to provide one or more segments of one or more user models at one or more abstraction levels based on security policies and privacy policies. Specifically, the system 100 introduces the capability to generate a segment of a user model and adjust the abstraction level of the segment of the user model based on the application and/or service that is calling for the user model in order to generate one or more recommendations. By providing an abstracted, segment of the user model, or ratings data based on the abstracted, segment of the user model, the user may control the amount of user data that is provided to the application and/or service to control the privacy and security of the user's data.

The user model is, for example, a latent vector (User Profile Vector (UPV)) representing the profile of one or more users. The user model may, for instance, include information about the user's behavior, preferences, or any other information associated with the user. Other information, for instance, may include collected data corresponding to various items related to the user of the device. The items may represent various features or settings, such as user interface modes, points of interest (POIs), consumer products or services, etc. Moreover, the user model may be locally generated on the device, for instance, based on user interaction information, ratings data, context information, or other information relating to the one or more items, the user of the device, and/or one or more other users. The generated segmented and abstracted user models may then be transferred to a recommendation service to generate one or more recommendations, for example, for the user. The segmented and abstracted user models may also be used to generate ratings data at the device, and the ratings data may then be transferred from the device to a recommendation service to generate the recommendations.

By way of example, the system 100 receives a request for a user model associated with an application. Based on one or more access credentials associated with the privacy level and/or the security level of the request, the system 100 determines to generate an abstracted user model for use in generating one or more recommendations at the application. The level of abstraction can be related to the privacy level and/or security level of the request such that, based on the privacy level and/or security level compared to one or more privacy policies and/or security policies, the application is provided an abstracted user model that fulfills the applications needs for generating one or more recommendations, yet maintains a level of privacy and/or security associated with the data regarding the user.

By way of example, a request for a user model is associated with a domain that describes the information to which an application or a service requires information associated with a user to provide one or more recommendations. The domain may be defined by a logical data description. Based on the domain, the system 100 generates a segment of a user model that is associated with the domain to limit the amount of information that is transferred or provided to the application or service. Thus, rather than providing an entire user model, the system 100 generates only a segment of the user model.

Where the system 100 provides ratings data to an application or service that made the request, the system 100 may also generate one or more segmented and/or abstracted item models that correspond to the user models. The item models are the corresponding items that can be recommended and/or are associated with the user data. Like the user models, the item models may depict, in latent terms, the items, characteristics of the items, groupings of the items, dependency between items, item relations, and the like. What exactly the item models depict is described by an accessible ontology. The item models may be computed based on collected data corresponding to various items that may be associated with the user or the user's device. Base item models may also be computed based on collected data associated with a group of test users.

As shown in FIG. 1, the system 100 comprises user equipment (UE) 101a-101n (collectively referred to as UE 101) having connectivity to a model platform 103 via a communication network 105. The UE 101 may include or have access to a one or more applications 111a-111n (collectively referred to as applications 111). The applications 111 may, for example, enable the UE 101 to interact with, for example, the model platform 103 to transfer user data (e.g., user interaction information, ratings information, context information) to the model platform 103. One or more of the applications 111 may request ratings data, one or more user models, or a combination thereof from the model platform 103 to generate one or more recommendations associated with the UE 101, the user of the UE 101, or a combination thereof.

The UE 101 may further include or have access to one or more sensors 115a-115n (collectively referred to as sensors 115) to collect data (e.g., user interaction information, rating information, context information) relating to the device and/or the user of the device. By way of example, one or more of the sensors 115 may correspond to location sensors (e.g., GPS), audio sensors (e.g., microphone), motion sensors (e.g., accelerometers) and the like that can determine context information associated with the UE 101, the user of the UE 101, or a combination thereof.

The model platform 103 may also include or have access to a model database 117 to store one or more previously generated user models. The previously generated user models may be user models at the lowest level of abstraction, or with no abstraction, such that user models generated at higher levels of abstraction may be generated using the stored, previously generated user models. The model database 117 may also store one or more segments of each previously generated user model, and may store one or more abstracted user models. The model database 117 may also store one or more item models, one or more segments of item models, and one or more abstracted item models that correspond to the abstracted user models.

The model platform 103 may also include or have access to a policy database 119 to store one or more access policies for determining access to the user models by requesting applications/services. The access policies may include one or more privacy policies and/or one or more security policies. When processing a request from an application or a service, the model platform 103 queries the policy database 119 for the one or more security policies and/or privacy policies related to the UE 101, the user of the UE 101, and the originating application and/or service that are associated with the request to determine whether to grant access to the user model.

The system 100 also may include a services platform 107 that includes one or more services 109a-109n (collectively referred to as services 109), and also includes one or more content providers 113a-113n (collectively referred to as content providers 113). The services platform 107 may provide one or more of the services 109 to the UE 101 and/or the model platform 103. The content providers 113 may provide content to the UE 101, the model platform 103, and/or the services platform 107. For example, a particular service 109a (e.g., a music or video service) may obtain content (e.g., media content) from a particular content provider 113a to offer to the UE 101 based on one or more recommendations generated based on one or more user abstracted models and/or ratings data based on one or more abstracted user models.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the model platform 103 may process a request for one or more recommendations, ratings data, and/or one or more user models to determine an abstraction level associated with the request. Based on an ontology that specifies a hierarchy of one or more item abstraction levels, the model platform 103 may generate one or more latent user models that can be used to generate one or more recommendations and/or ratings data. In one embodiment, the request may include one or more settings and/or parameters that explicitly request the abstraction level. In one embodiment, the request includes one or more access credentials that may be processed to determine the requested abstraction level. By way of example, the model platform 103 may process one or more access credentials and, based on the level of access the access credentials are associated with, may determine the requested abstraction level. In one embodiment, the request may contain a set of related items and their associated abstraction levels for which user ratings are sought.

Upon determining the requested abstraction level, the model platform 103 may cause a generation, retrieval, or a combination thereof of at least one level of a user model based on whether the user model exists or can be generated at the requested abstraction level. In one embodiment, the model platform 103 generates the user model based on the abstraction level requested and according to abstraction generation logic associated with the abstraction level. In one embodiment, the model platform 103 may have previously generated the user model at the requested abstraction level and may instead retrieve the user model from the model database 117. In one embodiment, the model platform 103 may retrieve a previously generated user model from the model database 117 and further modify the user model to generate a substantially new user model.

In one embodiment, the model platform 103 may process one or more user model segments to determine and/or generate a requested segment of the selected user model. The request may include one or more logical data descriptions that define a domain associated with the request and the segment. The domain may, for example, be associated with the subject of the one or more recommendations or ratings data. By way of example, the model platform 103 may be queried to generate a segment of a user model related to the music category of jazz. The model platform 103 may process the request to determine that the segment of the user model should be related to the music category jazz, and include categories such as soul jazz, 80s jazz, 90s jazz, classical jazz, etc. By way of another example, the model platform 103 may be queried to generate a segment of a user model related to a specific type of jazz, such as classical jazz.

Upon determining the segment of the user model associated with the request, the model platform 103 may cause a generation, a retrieval, or a combination thereof of the requested segment based on whether the requested segment exists. In one embodiment, the model platform 103 generates the segment of the user model based on the requested abstraction level and according to abstraction generation logic associated with both the abstraction level and the segment of the user model. In one embodiment, the model platform 103 retrieves a previously generated segment of a user model stored in the model database 117. In one embodiment, the model platform 103 may retrieve a previously generated segment of a user model from the model database 117 and further modify the segment to generate a substantially new segment of the user model.

In one embodiment, the model platform 103 processes the request to determine a privacy level, a security level, or a combination thereof associated with the request. The request may include one or more access credentials that the model platform 103 processes to determine the associated privacy level and security level. The access credentials may include privacy credentials and/or security credentials. The model platform 103 may also process the abstraction level and/or the segment of the user model that is associated with the request to determine a privacy level and/or a security level associated with the request. The privacy level controls the privacy associated with the user data, allowing a user to vary generated or retrieved user models according to the privacy level. The security level controls the security associated with the user model as well as authentication of requesting application/service, allowing a user to vary the generated or retrieved user model according to the security level.

By way of example, an application associated with the request may be executed on the UE 101. In which case, the application may have a high security level because the application is trusted at least enough for the user to execute the application on the UE 101. The application, however, may have a low privacy level because the user may still want to keep a high level of privacy regardless of whether the application is running on the UE 101 or not. Thus, in one embodiment, the privacy level, the security level, or a combination thereof is based, at least in part, on an originating location of the request, a location of the one or more applications and/or services associated with the request, or a combination thereof.

Upon determining the privacy level and/or security level associated with the request, the model platform 103 processes the privacy level and/or the security level against one or more privacy policies and/or security policies to determine permission to access the requested abstraction level of the user model. The model platform 103 may compare one or more privacy credentials and/or security credentials at the determined privacy level and/or security level against the one or more privacy policies and/or security policies to determine whether the application and/or service associated with the request has permission to access the requested abstraction level. In one embodiment, if access to the requested abstraction level is granted, the model platform 103 continues processing the request to generate the one or more user models and/or ratings data to fulfill the request. In one embodiment, if access to the requested abstraction level is not granted, the model platform 103 may provide the requesting application and/or service with a notice of the denial of access, a notice of what abstraction level of the user model the application and/or service may access, the user model at the other abstraction level the application and/or service may access, ratings data based on the user model the application and/or service may access, or a combination thereof.

In one embodiment, the model platform 103 determines user interaction information, ratings information, context information, or a combination thereof associated with the UE 101, a user of the UE 101 or a combination thereof and uses this collection of information to generate the one or more user models at the one or more abstraction levels for the one or more segments. The model platform 103 processes the collection of information based on one or more ontologies that associate the one or more item levels to the one or more abstraction levels of the one or more user models. The collection of information may be collected from, for example, one or more applications 111 running on the UE 101 (e.g., navigation applications, contacts applications, calendar applications, browser applications, audio applications, video applications, etc.) The collection of information may also be collected from, for example, one or more sensors 115 associated with the UE 101, one or more services 109 associated with the UE 101 and/or the user of the UE 101, one or more content providers 113 associated with the UE 101 and/or the user of the UE 101, or a combination thereof.

In one embodiment, the model platform 103 causes a generation, a retrieval, or a combination thereof of one or more item models associated with the one or more abstraction levels. The one or more item models are generated or retrieved so as to correspond with the one or more user models at the same level of abstraction as the one or more user models. The model platform 103 further causes a selection of at least one of the item models for generating the one or more recommendations, ratings data, or a combination thereof based on the one or more privacy policies, the one or more security policies, the selected user model, the requested abstraction level, or a combination thereof. In one embodiment, the selected item model is at the same level of abstraction as the user model so as to correspond to the latent factors used to generate the user model. In one embodiment, the selected items model is segmented according to the segment of the user model. In one embodiment, the items model is not segmented according to the segmentation of the user model.

By way of example, the UE 101, the model platform 103, the services platform 107 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
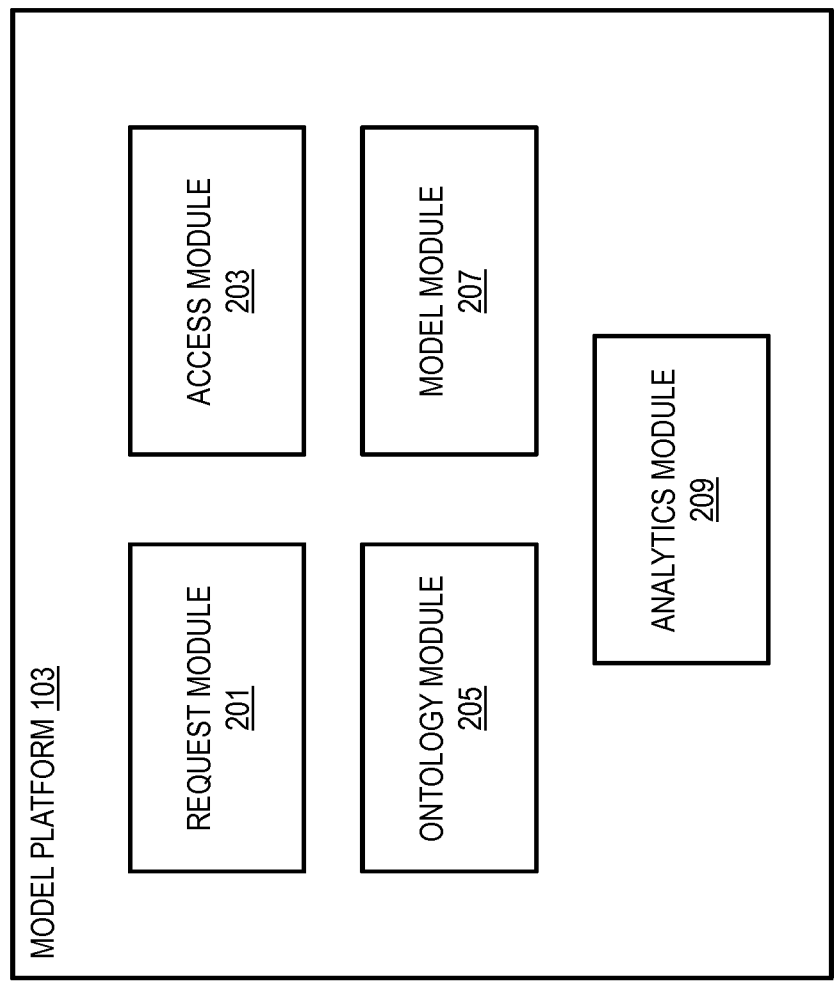
FIG. 2 is a diagram of the components of a model platform, according to one embodiment.

FIG. 2 is a diagram of the components of the model platform 103, according to one embodiment. By way of example, the model platform 103 includes one or more components for providing one or more segments of one or more user models at one or more abstraction levels based on security policies and/or privacy policies. It is contemplated that the functions of these components may be combined in one or more components or performed by other components of equivalent functionality. For example, the model platform 103 may be embodied in one or more applications 111 executed at the UE 101 and/or one or more services 109 at the services platform 107. In this embodiment, the model platform 103 includes a request model 201, an access module 203, an ontology module 205, a model module 207 and an analytics module 209.

In one embodiment, the request model 201 processes the one or more requests received at the model platform 103 for ratings data, one or more user models, or a combination thereof. The request may originate from one or more applications and/or services, such as one or more applications 111 at the UE 101, one or more services 109 at the services platform 107, one or more content providers 113, or a combination thereof. The request model 201 processes the request to determine the user model associated with the request, the domain and/or segment of the user module associated with the request, the abstraction level associated with the request, and the privacy and security levels associated with the request.

In one embodiment, the access module 203 determines whether the application and/or service associated with the request is granted access to the requested abstraction level of one or more user models based on the access credentials associated with the request, the application or service associated with the request, and the location of the application or service associated with the request. The access module 203 determines to grant access to one or more user models at one or more abstraction levels based on one or more access policies stored in the policy database 119. The access policies include privacy policies and security policies. The privacy policies control the privacy of the user information used to generate the one or more user models at the one or more abstraction levels. The security policies control the security of the user information used to generate the one or more user models at the one or more abstraction levels.

In one embodiment, the ontology module 205 includes one or more ontologies for specifying a hierarchy of one or more abstraction levels for items against which user models can be generated. Using the descriptions and relations expressed in the item ontology, the model platform 103 will generate latent models for user data and item data corresponding to each item level in the ontology provided those items and levels are supported by the particular implementation and whether those item or related items have been used by the user to gather ratings data. Each item that may be associated with user behavior and/or user preference information, and thus can be included in the ontology that describes item characteristics, groupings to which the item belongs, dependency between items, item relations, etc. that are modeled at different hierarchy levels. Each item that may be associated with one or more recommendations and/or ratings data similarly include characteristics, groupings to which the item belongs, dependency between items, item relations, etc. that are modeled in item ontology at different hierarchy levels. In one embodiment, the ontology module 205 allows for conformation to standard ontology for user models and item models with mappings to privacy profiles.

In one embodiment, the model module 207 generates and/or retrieves one or more user models, performs the abstraction of the one or more user models, and generates the segments of the one or more user models. The abstraction process of the one or more user models is based on abstraction generation logic, for example, pre-defined literals or through mathematical formulae resolvable to rating values expressed by child items in the ontology. The abstraction generation logic may be implementation dependent and the logic will depend on how abstract the corresponding items have been described in the ontology. In one embodiment of the abstraction generation logic, the implementation may be an averaging of the latent values at one level (e.g., abstraction level or child level) to obtain the next abstraction level. In one embodiment of the abstraction generation logic, the implementation may use more complicated mathematical formulae including inferences to reach the next abstraction level (e.g., for the user model). The model module 207 may also generate one or more segments of the user models and/or the item models based on the domain of the request.

In one embodiment, the one or more ontologies define L distinct abstraction levels (e.g., that will correlate to different levels of privacy and security when using the abstraction levels). For each abstraction level, a user model of dimension f is chosen to control the amount of detail that is collected to generate the user model (e.g., the latent factors that are used to generate the user model at the abstraction level). Thus, in one embodiment, rather than generating a single user model based on all of the latent factors that includes the largest amount of information at the smallest level of granularity, without any abstraction, L different levels of abstraction corresponding to L different user models may be generated, with each user model having a different dimensions for f.

In one embodiment, for explanatory purposes only, a matrix factorization method to generate the user models is based on the rating R (of dimension N×M) as the product of two smaller matrices P and Q of smaller dimension N×f and M×f respectively, where the matrix P is obtained by putting user models of test users side-by-side. The estimated ratings are expressed as $$\hat{r}_{ui} = \mu + b_i + b_u + q_i^T v_u$$

where $\mu$, $b_i$, $b_u$ are biases, $v_i$ are columns of P, and $q_i$ are columns and/or elements of Q. The values of all these additional variables and vectors is optimized in order to minimize the squared prediction error on available ratings according to $$\min_{Q,\mu,b} \sum_{i,u} (r_{ui} - \hat{r}_{ui}) + \lambda \|q_i\|^2$$

where $\lambda$ is the regularization parameter. The resulting vectors $q_i$ are the item models of the items. This optimization is performed for each abstraction level to obtain item models at each level.

In another embodiment of this method, the item models may be computed in a single optimization step. First, the above optimization is performed for the largest available user model, of dimension f. Then, a set of item models that provide optimal rating predictions $$\hat{R} = Q^T P$$

is used. Then, any unitary transformation of the matrices P and Q provide the same predictions:

$$\hat{R} = Q^T U^T U P$$

for any unitary matrix U of dimension f×f. Among the possible unitary matrices U, one can choose the one such that the predictions made with only the first f' rows of UP and UQ are still optimal (such a transform is obtained by singular value decomposition). With this method, full length item models are used, but only the f' first components of the user models are necessary to provide ratings data at a certain level.

In one embodiment, the analytics module 209 collects the information pertaining to the user interaction information, the ratings information, the context information, or the combination thereof. This collection of information may be related to a UE 101, a user of the UE 101, one or more other users, one or more items, one or more settings, one or more preferences, or a combination thereof. For example, the analytics module 209 may cause one or more of the UE 101 to collect the data. The user interaction information may include information about the user's interactions within the UE 101 (internal usage) as well as information about the user's interaction with external devices or services (external usage). The ratings information may include, for example, ratings assigned for the items. By way of example, a user may be requested to provide ratings for one or more items (e.g., music tracks, books, movies, etc.) and the user's ratings of the items may be maintained as the ratings information. The context information may include sensor data collected from one or more of the sensors 115, such as from a location sensor, a speed sensor, an audio sensor, etc. The context information may also include information collected from one or more applications running at the UE 101, such as, for example, a calendar application, a contacts application, user profile information associated with one or more applications, etc. In one embodiment, the analytics module 209 stores the collected information in the model database 117 associated with user and/or the UE 101 from which the data was collected. In one embodiment, the analytics module 209 stores the collected information according to one or more latent factors associated with the ontology for later generating one or more user models based on the information.

Figure 3:
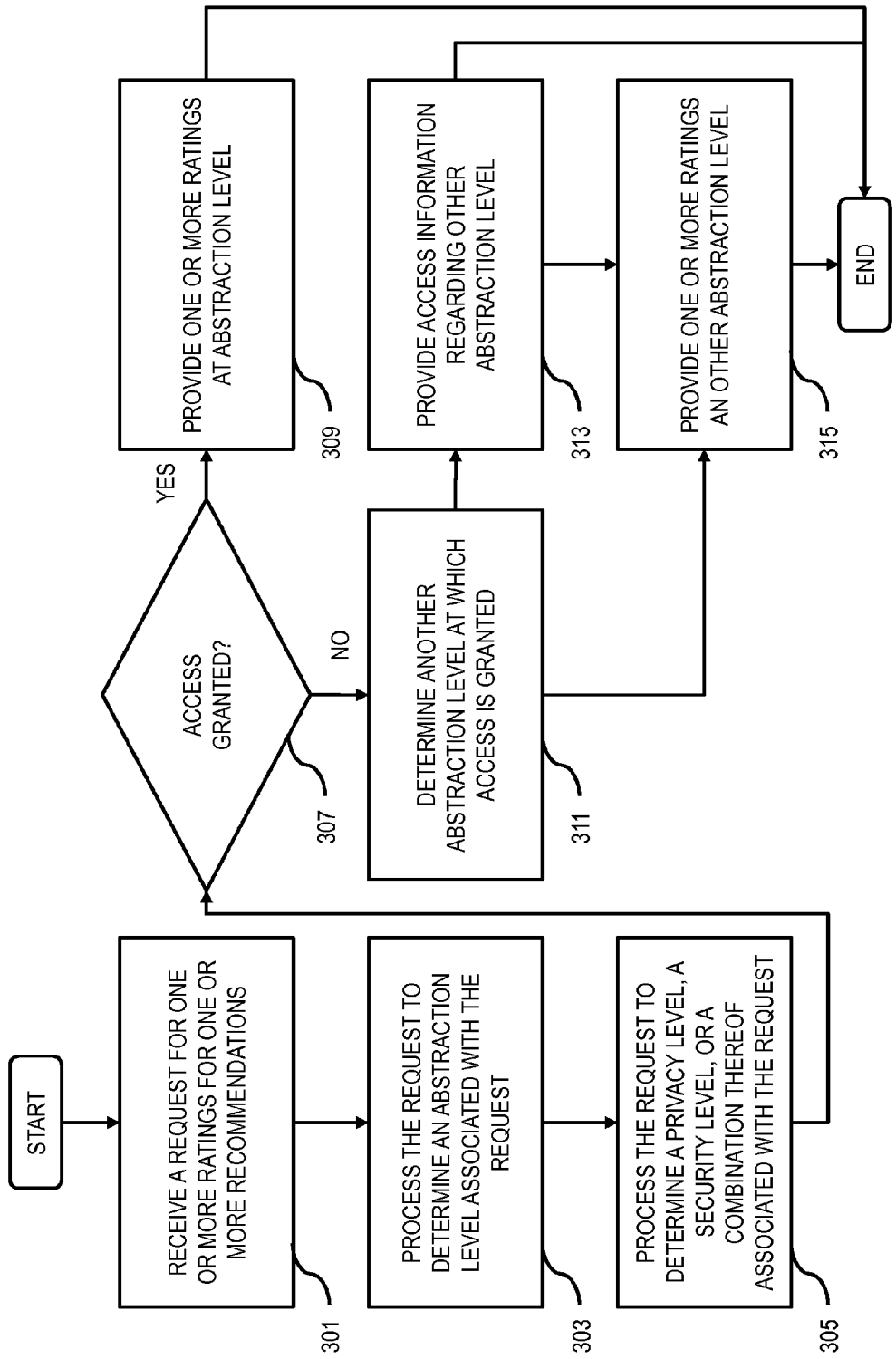
FIG. 3 is a flowchart of a process for determining permission to access one or more abstracted user models, according to one embodiment.
Figure 10:
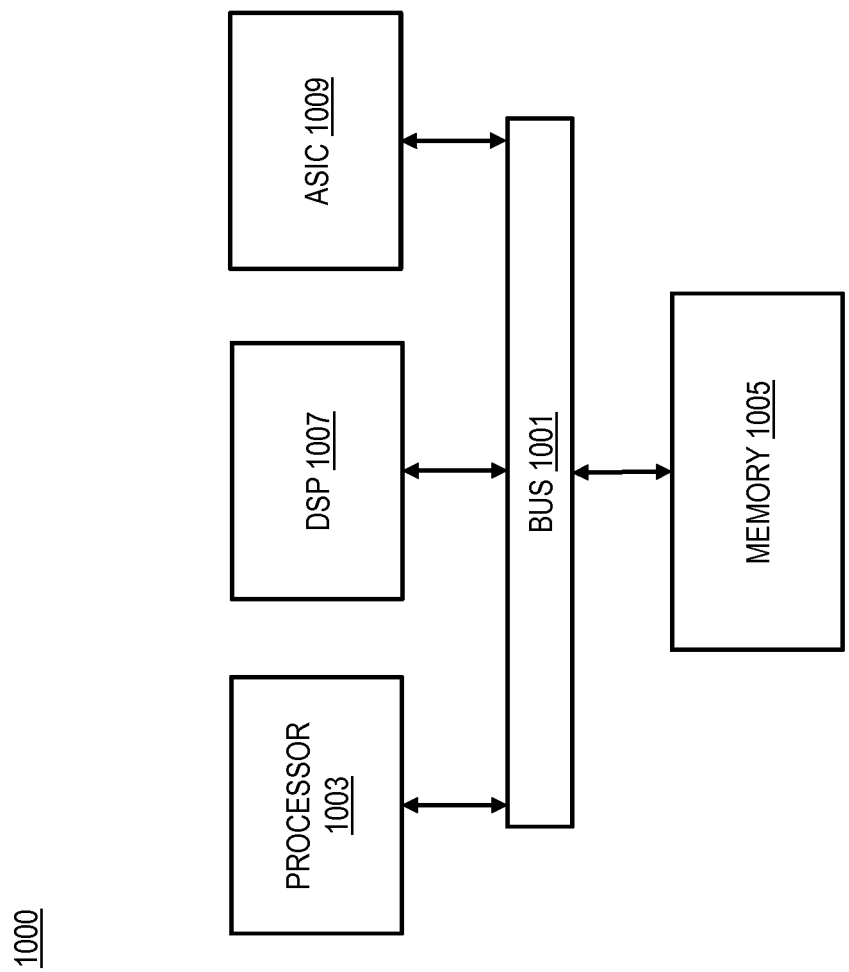
FIG. 10 is a diagram of a chip set that can be used to implement an embodiment of the invention.

FIG. 3 is a flowchart of a process 300 for determining permission to access one or more abstracted user models, according to one embodiment. In one embodiment, the model platform 103 performs the process 300 and is implemented in, for instance, a chip set including a processor and a memory as shown in FIG. 10. In step 301, the model platform 103 receives a request for ratings data, one or more user models, or a combination thereof. By way of example, an application 111a running on the UE 101 may request from the model platform 103 for a user model associated with the UE 101 and/or the user of the UE 101 to use to generate one or more recommendations. In one embodiment, the request includes one or more access credentials related to, for example, privacy levels and/or security levels associated with the requested user model. In one embodiment, the request also includes one or more domains regarding, for example, a logical data description associated with ratings data and/or one or more user models.

In step 303, the model platform 103 processes the request to determine an abstraction level associated with the request. The abstraction level is determined, for example, based on the parameters that are associated with the request. Thus, for example, the request may be associated with determining the type of music the user associated with the UE 101 prefers. Such a request may be associated with a high abstraction level since the domain of the request is general (e.g., music preference). The request may be instead associated with determining the type of jazz the user associated with the UE 101 prefers. Such a request may be associated with a medium abstraction level because the domain of the request is more specific (e.g., music preference within one category of music). Further, the request may be associated with determining which classical jazz tracks the user associated with the UE 101 prefers. Such a request may be associated with a low abstraction level, if an abstraction level at all, because the domain of the request is even more specific (e.g., music preference related to specific tracks).

In step 305, the model platform 103 processes the request to determine a privacy level, a security level, or a combination thereof associated with the request. In one embodiment, the request may include one or more access credentials that directly specify the privacy level and/or the security level that are associated with the request. The model platform 103 may process the access credentials to determine the privacy level and/or the security level associated with the request. In one embodiment, the model platform 103 determines the privacy level and/or the security level based on the abstraction level determined in step 303. By way of example, each abstraction level may have an associated privacy level and/or security level. In one embodiment, the model platform 103 determines the privacy level and/or security level associated with the request based on the determined abstraction level and based on access credentials associated with the request. In which case, the model platform 103 may verify that the privacy level and/or the security level associated with the determined abstraction level matches the privacy level and/or security level based on the access credentials.

In step 307, the model platform 103 determines whether the access credentials regarding the privacy level and/or the security level satisfy one or more privacy policies and/or security policies. The privacy policies and/or security policies limit access to the user models at various levels of abstraction based on, for example, the application and/or service that originated the request, the location of the application and/or service that originated the request, and the like. If the access credentials satisfy one or more privacy policies and/or security policies, the process proceeds to step 309. If the access credentials do not satisfy the one or more privacy policies and/or security policies, the process 300 proceeds to step 311.

At step 309, the model platform 103 provides the ratings data, one or more user models at one or more abstraction levels, or a combination thereof as requested in the request, as described in detail below with respect to FIGS. 4-7.

At step 311, the model platform 103 determines an abstraction level at which access would be granted based on the access credentials contained within the request. In one embodiment, the model platform 103 determines the lowest abstraction level at which access would be granted and that satisfies the one or more privacy policies and security policies. By way of example, if access credentials associated with the request satisfy a medium abstraction level based on a privacy policy and satisfy a low abstraction level based on the security policy, the model platform 103 determines that access is granted to the medium abstraction level based on the privacy policy and the security policy.

In one embodiment, the model platform 103 provides access information to the application and/or service associated with the request regarding, for example, the abstraction level at which access is not being provided and the abstraction level at which access is being provided based on the access credentials at step 313. Thus, in one embodiment, the application or service associated with the request is provided an opportunity to provide additional access credentials that may satisfy the privacy policy and/or the security policy associated with the abstraction level at which access was originally requested.

In one embodiment, the model platform 103 provides the ratings data, one or more user models, or a combination thereof as requested in the request based on the other abstraction level at which access is granted in step 311. Thus, rather than notifying the application or service associated with the request, the model platform 103 provides the requested information but at the higher level of abstraction to maintain privacy and/or security. However, in one embodiment, the model platform 103 performs both steps 313 and 315 to both notify the application or service associated with the request of the use of the higher abstraction level and the requested information at the higher abstraction level. After steps 309, 313, or 315, the process 300 may end, or repeat if another request is received at the model platform 103.

Figure 4:
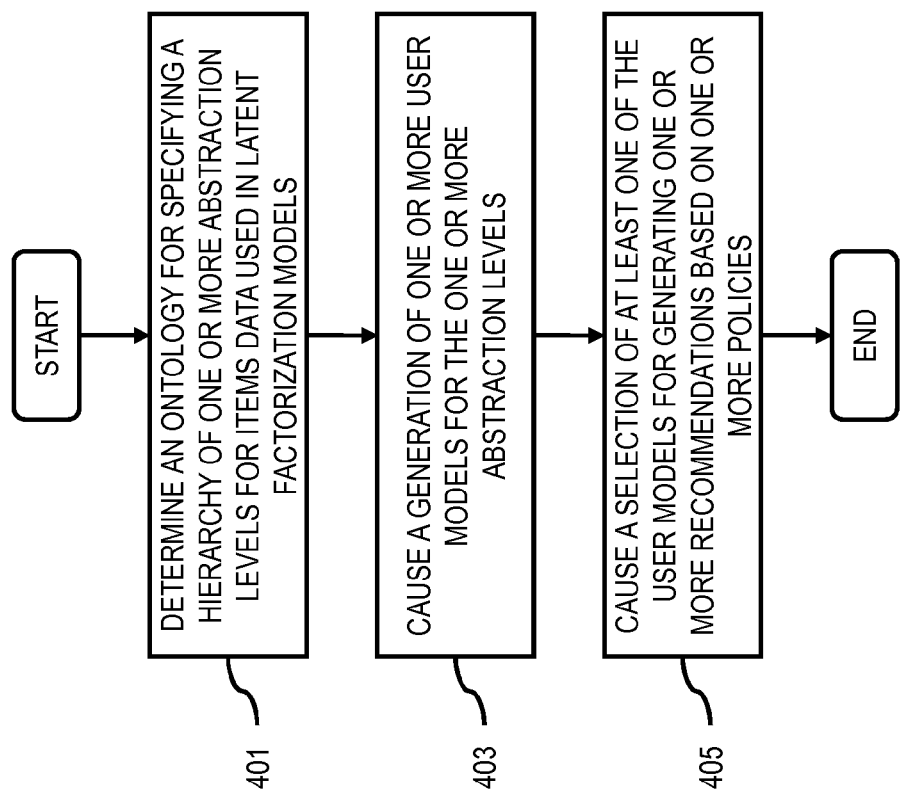
FIG. 4 is a flowchart of a process for providing abstracted user models in accordance with one or more access policies, according to one embodiment.

FIG. 4 is a flowchart of a process 400 for providing abstracted user models in accordance with one or more access policies, according to one embodiment. In one embodiment, the model platform 103 performs the process 400 and is implemented in, for instance, a chip set including a processor and a memory as shown in FIG. 10. In step 401, the model platform 103 determines an ontology for specifying a hierarchy of one or more abstraction levels for item levels. The ontology defines each item (e.g., any feature or element for which there is associated a preference and/or rating), the item's characteristics, groupings to which items belong, dependency between items, item relations, etc. The ontology describes multiple levels of item hierarchy along with constructs describing each level of abstraction. At a base level of ontology (child nodes), specific items such as, for example, a music track name can be included within an item list against the category for which it may belong along with its ratings data and other meta-information. An abstraction process is carried out according to abstraction generation logic for the particular item's category and applied for all items within the item category to generate an abstract value for the next level item category as specified in the ontology. The abstraction process, as discussed above, may be performed through predefined literals or through mathematical formulae resolvable to rating values expressed by child item in the ontology. The process can be carried out for multiple nodes at higher and higher levels of abstraction based on the one or more latent factors. In one embodiment, the ontology may specify three to four abstraction levels of item information that may be used to build factorization models for those levels. However, in one embodiment, depending on certain items and their characteristics, groupings to which items belong, dependency between items, item relations, etc., the level of abstraction may be limited to a fewer number of abstraction levels that other items (e.g., one to two abstraction levels rather than three to four).

In step 403, the model platform 103 causes a generation of one or more user models for the one or more abstraction levels associated with the ontology. The model platform may collect user interaction information, ratings information, context information, or a combination thereof as the one or more items associated with the ontology. Based on the hierarchy of the one or more abstraction levels, the model platform 103 generates one or more user models at various abstraction levels. The recommendations generated from item versus user models at low abstraction levels have small granularity and the recommendations generated from item versus user models at high abstraction levels have a large granularity. In one embodiment, the amount of detail (e.g., granularity, specificity of the collected information) changes in relation to the abstraction level. Thus, for example, the amount of detail is higher at low abstraction levels and the amount of detail is lower at high abstraction level. Thus, for example, the variation in the level of abstraction, and therefore the granularity and/or amount of data contained in the user models allows the model platform 103 to control the privacy and security of the data associated with a UE 101 and/or a user of the UE 101 while still providing personalized user experiences.

In step 405, the model platform 103 causes a selection of at least one of the user models for generating one or more recommendations for one or more applications and/or one or more services that originated the request based on one or more policies. The policies may be privacy policies and/or security policies. The model platform 103 selects the user model based on the abstraction level that the application and/or service is authorized to receive. What level of authorization the application and/or service is authorized to receive is based on one or more access credentials associated with the application and/or service, as discussed above with respect to FIG. 3.

By way of example, an application requests a user model to generate one or more recommendations. Based on access credentials associated with the application, the model platform 103 selects one of the previously generated user models at a certain abstraction level. The abstraction level corresponds to the level at which the access credentials are satisfied. The selected user model may then be transferred to the application or further processed to generate ratings data that may then be passed to the application.

Figure 5:
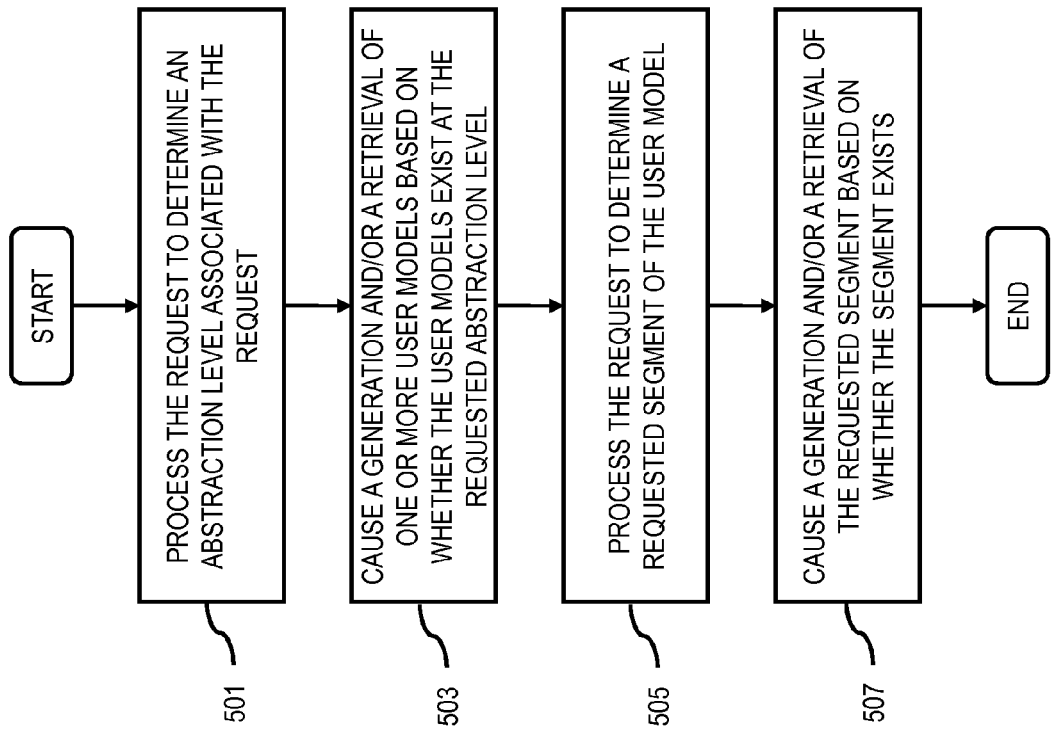
FIG. 5 is a flowchart of a process for determining an abstraction level of, and segment of, one or more user models, according to one embodiment.

FIG. 5 is a flowchart of a process 500 for determining an abstraction level of, and segment of, one or more user models, according to one embodiment. In one embodiment, the model platform 103 performs the process 500 and is implemented in, for instance, a chip set including a processor and a memory as shown in FIG. 10. In step 501, the model platform 103 processes the request to determine an abstraction level associated with the request. The abstraction level may be determined in several different ways.

In one embodiment, the request will explicitly define the abstraction level of the user model that is requested. By way of example, the request will contain a parameter or variable that is set to the requested abstraction level. In one embodiment, the request will include one or more access credentials. One of the access credentials may include the parameter or variable that is related to the requested abstraction level. In one embodiment, one or more of the access credentials include one or more privacy credentials and/or security credentials. The privacy credentials and/or security credentials may be associated with certain abstraction levels, such that including a specific privacy credential and/or security credential impliedly requests a certain abstraction level. In one embodiment, the request includes a request for a specific user model and/or a domain of a user model. The model platform 103 may process the specific user model and/or domain of the user model to determine the abstraction level associated with the request. In one embodiment, the request may contain a set of related items and their associated abstraction levels for which user ratings are sought.

In step 503, the model platform 103 causes a generation or a retrieval of one or more user models based on whether the user models exists at the requested abstraction level. After determining the requested abstraction level, the model platform 103 determines if the user model exists at the desired abstraction level (e.g., if the user model at the abstraction level was previously created). For instance, the desired abstraction level may be in the model database 117. If the user model at the abstraction level exists, the model platform 103 selects the user model. If the user model does not exist, the model platform 103 may create the user model at the desired abstraction level, as discussed above in relation to step 403.

In one embodiment, in step 505, the model platform 103 may process the request to determine a requested segment of the user model. The request may be associated with a domain or a segment of a user model, as designated by a logical data description. The model platform 103 processes the request to determine whether the request is associated with a specific domain. The request may include information expressly indicating that the request is associated with a domain, or the request may be impliedly related to a domain based on, for example, the one or more recommendations associated with the request.

In step 507, the model platform 103 causes a generation and/or a retrieval of the requested segment based on whether the segment exists. After determining the request segment of the user model, the model platform 103 determines if the segment of the user model already exists at the desired abstraction level (e.g., if the segment of the user model was at the abstraction level was previously created). For instance, the desired segment of the user model at that desired abstraction level may be in the model database 117. If the segment of the user model at the abstraction level exists, the model platform 103 selects the segment of the user model. If the segment does not exist, the model platform 103 may create the segment based on the ontology and the items that are related to the domain.

By way of example, a request for one or more recommendations may be associated with determining what type of music a user enjoys listening to. Based on the ontology and the one or more items used in creating the user model, only certain segments of the user model are relevant for determining the music a user enjoys listening to. Accordingly, the model platform 103 may determine the segment associated with the user model that is applicable to determining the type of music a user enjoys listening to, and pass only this portion of the user model, at a certain abstraction level, to the application or service that requested the one or more recommendations.

Figure 6:
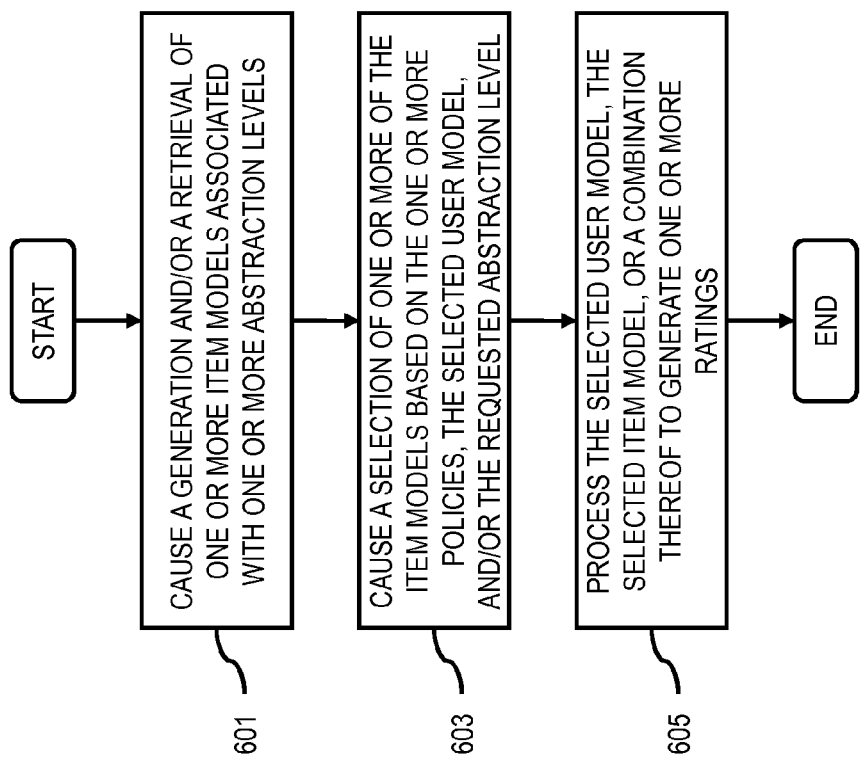
FIG. 6 is a flowchart of a process 600 for generating and/or retrieving one or more item models for providing ratings data, according to one embodiment.

In one embodiment, the model platform 103 may generate and/or retrieve one or more user models and/or segments of user models, at one or more abstraction levels, and provide the one or more user models to the requesting one or more applications and/or one or more services to generate the ratings data for generating one or more recommendations. In one embodiment, the model platform 103 may generate the ratings data and send the ratings data to the one or more applications and/or one or more services for generating one or more recommendations. FIG. 6 is a flowchart of a process 600 for generating and/or retrieving one or more item models for providing ratings data, according to one embodiment. In one embodiment, the model platform 103 performs the process 600 and is implemented in, for instance, a chip set including a processor and a memory as shown in FIG. 10.

In step 601, the model platform 103 causes a generation and/or retrieval of one or more item models associated with the requested abstraction level of the selected user model. Corresponding to each abstraction level in ontology for the user models is an abstraction level in ontology for the item models. The item models may be created internally by one or more applications and/or services associated with the UE 101, or may be created externally by one or more services 109 and/or content providers 113. Where the one or more item models are created externally, the model platform 103 retrieves the item models based on the levels of abstraction of the one or more generated user models. The correct item model associated with a user model may be determined based on meta-information correspond to the user models and/or the item models.

In step 603, the model platform 103 causes a selection of at least one of the one or more item models for generating the one or more recommendations based on one or more of the privacy policies, one or more of the security policies, the selected user model, the request abstraction level, or a combination thereof. In one embodiment, the model platform 103 may select at least one item model based on the one or more privacy policies and/or the one or more security policies associated with the request. Similar to the discussion above with respect to determining an abstraction level associated with a user model, the privacy and/or security levels that an application and/or service are granted based on the access credentials may allow the model platform 103 to select at least one of the one or more item models. In one embodiment, the model platform 103 may select at least one item model based on the selected user model at the requested or allow abstraction level. For instance, the model platform 103 may select the item model that corresponds to the selected user model at the set abstraction level. In one embodiment, the model platform 103 may select the item model based on the requested abstraction level associated with the request.

In step 605, the model platform 103 processes the selected user model, the selected item model, or a combination thereof to generate ratings data for generating one or more recommendations. The user model, which represents preferences (e.g., ratings) of the user, is processed along with the item model, which represents qualities and/or aspects associated with items, to generate ratings data associated with the item of the item module. The ratings data can then be used to generate one or more recommendations.

FIG. 7 is a flowchart of a process 700 for collecting information used to generate one or more user models, according to one embodiment. In one embodiment, the model platform 103 performs the process 700 and is implemented in, for instance, a chip set including a processor and a memory as shown in FIG. 10. In step 701, the model platform 103 determines user interaction information, ratings information, context information, or a combination thereof related to the UE 101, the user of the UE 101, one or other users associated with the UE 101 and/or the user of the UE 101, one or more items, or a combination thereof. By way of example, the user interaction information may include information pertaining to the user's interactions associated with the UE 101 (internal interactions) and may include information pertaining to the user's interactions outside of the UE 101 (external interactions). By way of example, the ratings information may include ratings data of one or more items associated with the user and/or the UE 101. For instance, a user may make one or more ratings associated with music played on the UE 101, with video streamed on the UE 101, with web pages browsed on the UE 101, etc. This information is collected as ratings information. By way of example, the context information may include information pertaining to the context of the UE 101 and/or the user of the UE 101. The context information may include the location of the UE 101 (e.g., GPS), the speed and/or acceleration of the UE 101 (e.g., accelerometer), one or more planned events associated with the UE 101 (e.g., from a calendar application), one or more destinations associated with the UE 101 (e.g., from a navigation application), and the like.

After collecting the information, in step 703, the information is processed based on one or more ontologies to generate user models for one or more abstraction levels, as discussed in detail above. Upon generating the user models, the models are stored in the model database 117 according to the user and/or the UE 101 associated with the collected information.

Figure 8B:
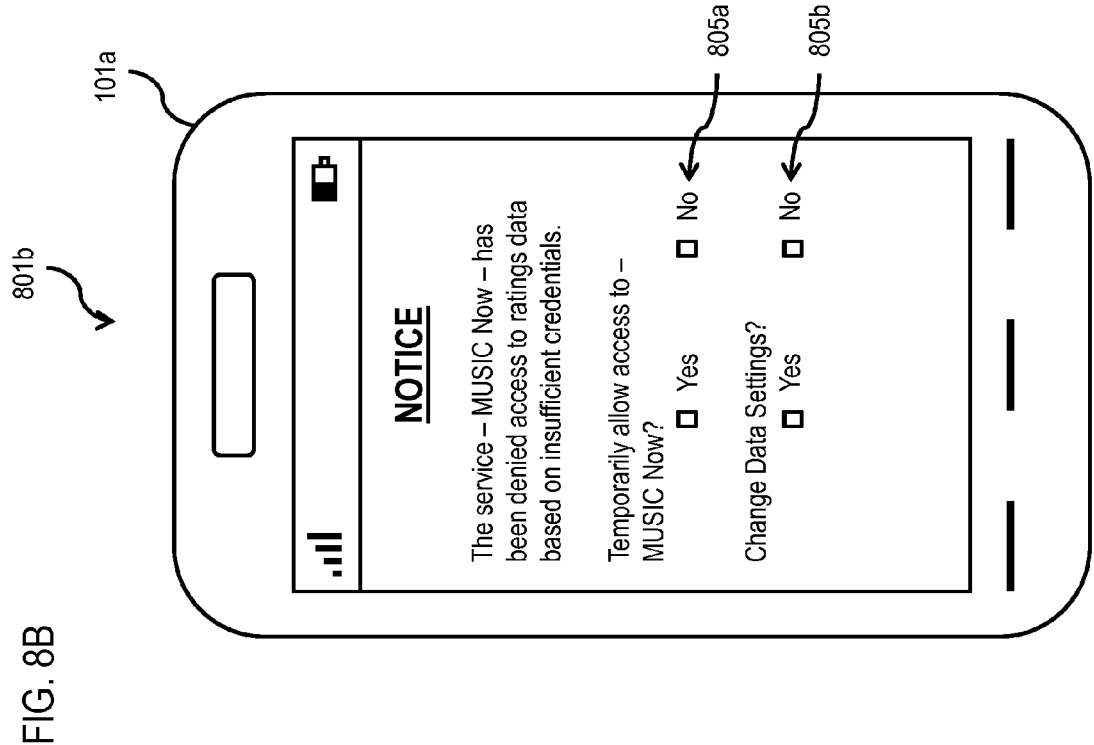
FIGS. 8A-8C are diagrams of user interfaces utilized in the processes of FIGS. 3-7, according to various embodiments.
Figure 8A:
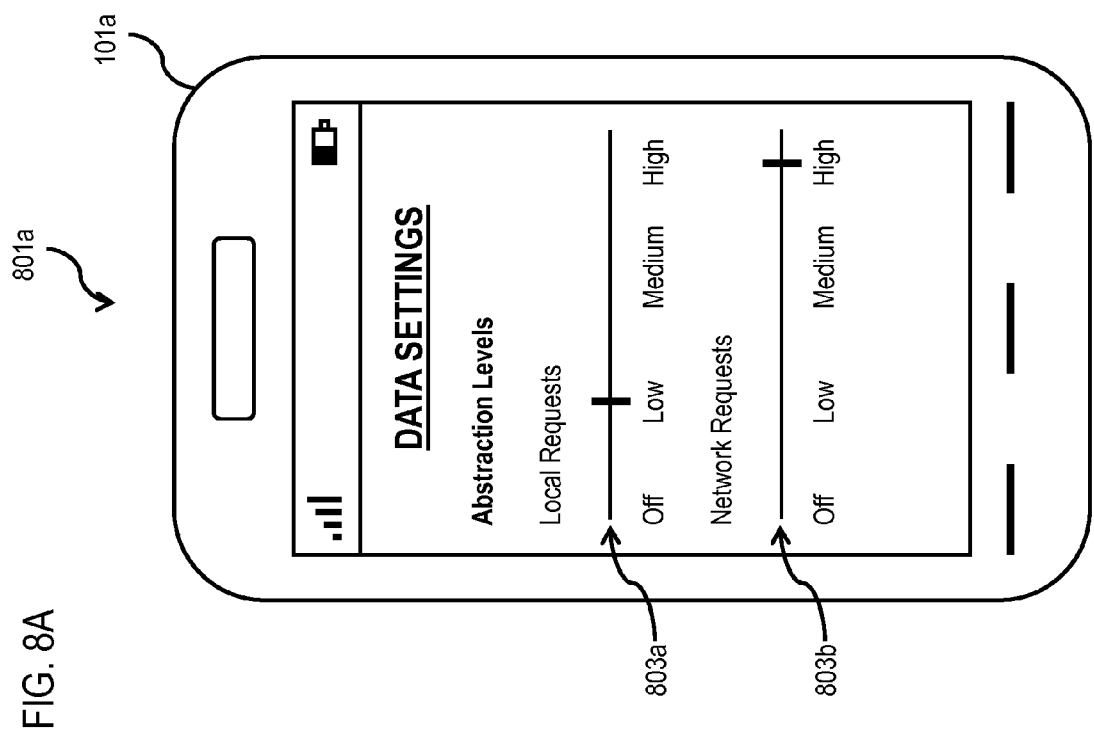
Figure 8C:
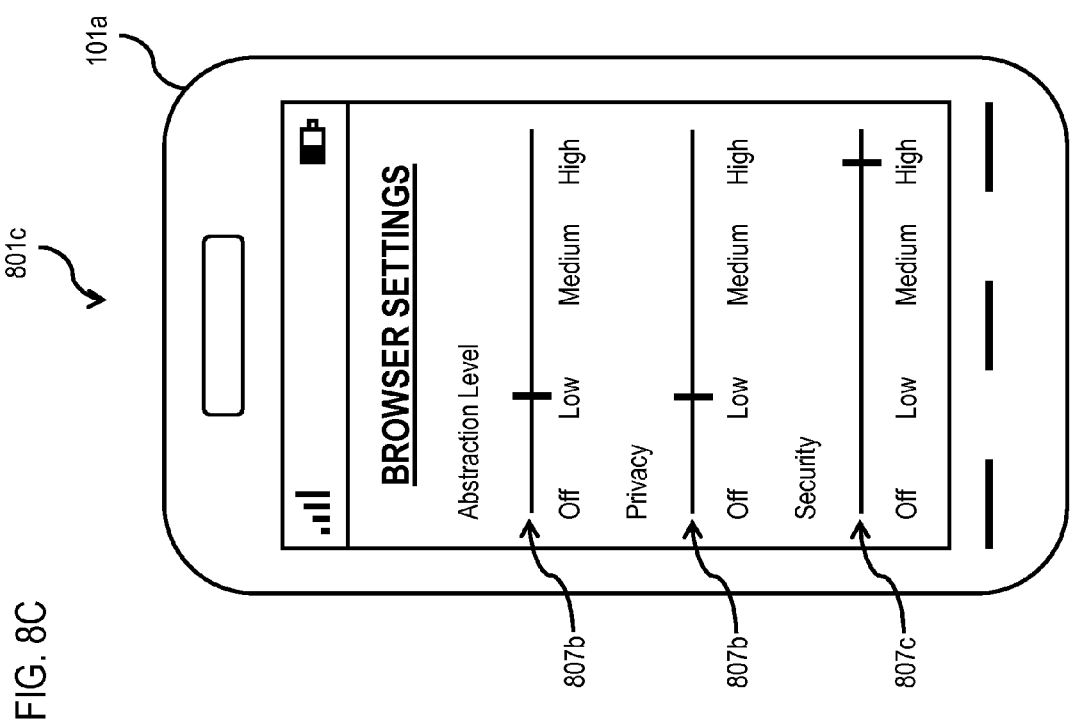

FIGS. 8A-8C are diagrams of user interfaces utilized in the processes of FIGS. 3-7, according to various embodiments. Although many, if not all, of the steps in the processes of FIGS. 3-7 can be performed in the background, without user interfaces, certain steps may be associated with various user interfaces. For example, FIG. 8A illustrates the user interface 801a associated with a UE 101a that allows the user of the UE 101a to setup and control the level of abstraction associated with user models that are associated with the UE 101a and/or the user of the UE 101a. By way of example, the user interface 801a allows the user to change the level of abstraction of the user models and/or segments of the user models according to the originating location of the request. The user interface 801a includes indicators 803a and 803b that are associated with the level of abstraction for local requests and non-local requests (e.g., network requests). Local requests may originate from, for example, one or more applications, one or more services, or a combination thereof located on the UE 101a. Whereas network requests may originate from, for example, one or more applications, one or more services, or a combination thereof in communication with the UE 101a over the communication network 105. As illustrated in FIG. 8A, the abstraction level for local requests related to indicator 803a is set to low (e.g., a low amount of abstraction is performed, small granularity) and the abstraction level for network requests related to indicator 803b is set to high (e.g., a high level of abstraction is performed, large granularity). The setup illustrated in FIG. 8A may arise, for example, because the user of the UE 101a has more trust in the applications and services located at the UE 101a than applications and services located outside of the UE 101a. Thus, the user allows for a lower level of abstraction (e.g., smaller granularity) for the local, trustworthy applications and services as compared to the network applications and services. Although illustrated as slider bars, the indicators 803a and 803b can be any type of indicator (e.g., drop down menu, icons, etc.) that allows the user of the UE 101 to adjust the settings.

FIG. 8B illustrates the embodiment where the user interface 801b is associated with a UE 101a when the UE 101a receives a notification that an application or service requested ratings data and/or a user model to generate one or more recommendations, yet the access credentials associated with the request did not satisfy the access policies associated with the ratings data and/or user model. Accordingly, the model platform 103 generates the user interface 801b at the UE 101a to notify the user of the rejected request and allows the user to, for example, temporarily allow access for the application or service to the requested ratings data and/or user model based on indicator 805a. The user interface 801b also includes, for example, indicator 805b that allows the user to access the data settings user interface 801a illustrated in FIG. 8A or the application/service user interface 801c illustrated in FIG. 8C (discussed below) to permanently adjust the access credentials for the application or service.

FIG. 8C illustrates the user interface 801c associated with a UE 101a for changing the settings for a particular application or service. By way of example, the user interface 801c illustrates the ability to change the abstraction level using indicator 807a, the privacy level using indicator 807b, and the security level using indicator 807c for the particular application (e.g., browser application) on the UE 101a. Thus, by way of example, the indicator 807b illustrates that the privacy level associated with the browser is low, requiring low security privacy for the browser to obtain ratings data and/or a user model to generate one or more recommendations. However, the indictor 807c illustrates that the security level associated with the browser is high, requiring high security credentials for the browser to obtain ratings data and/or a user model to generate one or more recommendations. As discussed above, although illustrated as slider bars, the indicators 803a and 803b can be any type of indicator (e.g., drop down menu, icons, etc.) that allows the user of the UE 101 to adjust the settings.

The processes described herein for providing abstracted user models in accordance with one or more access policies may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
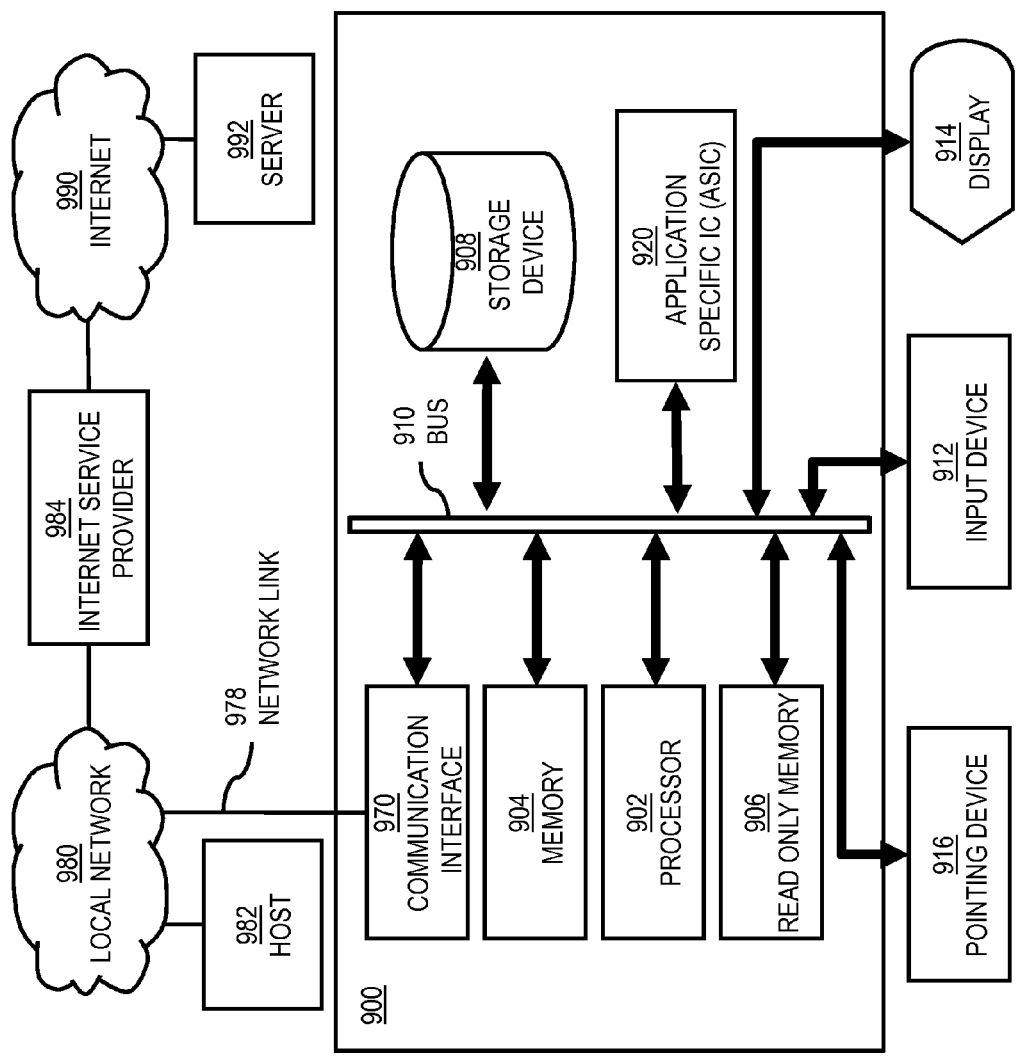
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide abstracted user models in accordance with one or more access policies as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing abstracted user models in accordance with one or more access policies.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing abstracted user models in accordance with one or more access policies. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing abstracted user models in accordance with one or more access policies. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing abstracted user models in accordance with one or more access policies, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing abstracted user models in accordance with one or more access policies related to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide abstracted user models in accordance with one or more access policies as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing abstracted user models in accordance with one or more access policies.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide abstracted user models in accordance with one or more access policies. The memory 1005 also stores the data associated with or generated by the execution of the inventive steps.

Figure 11:
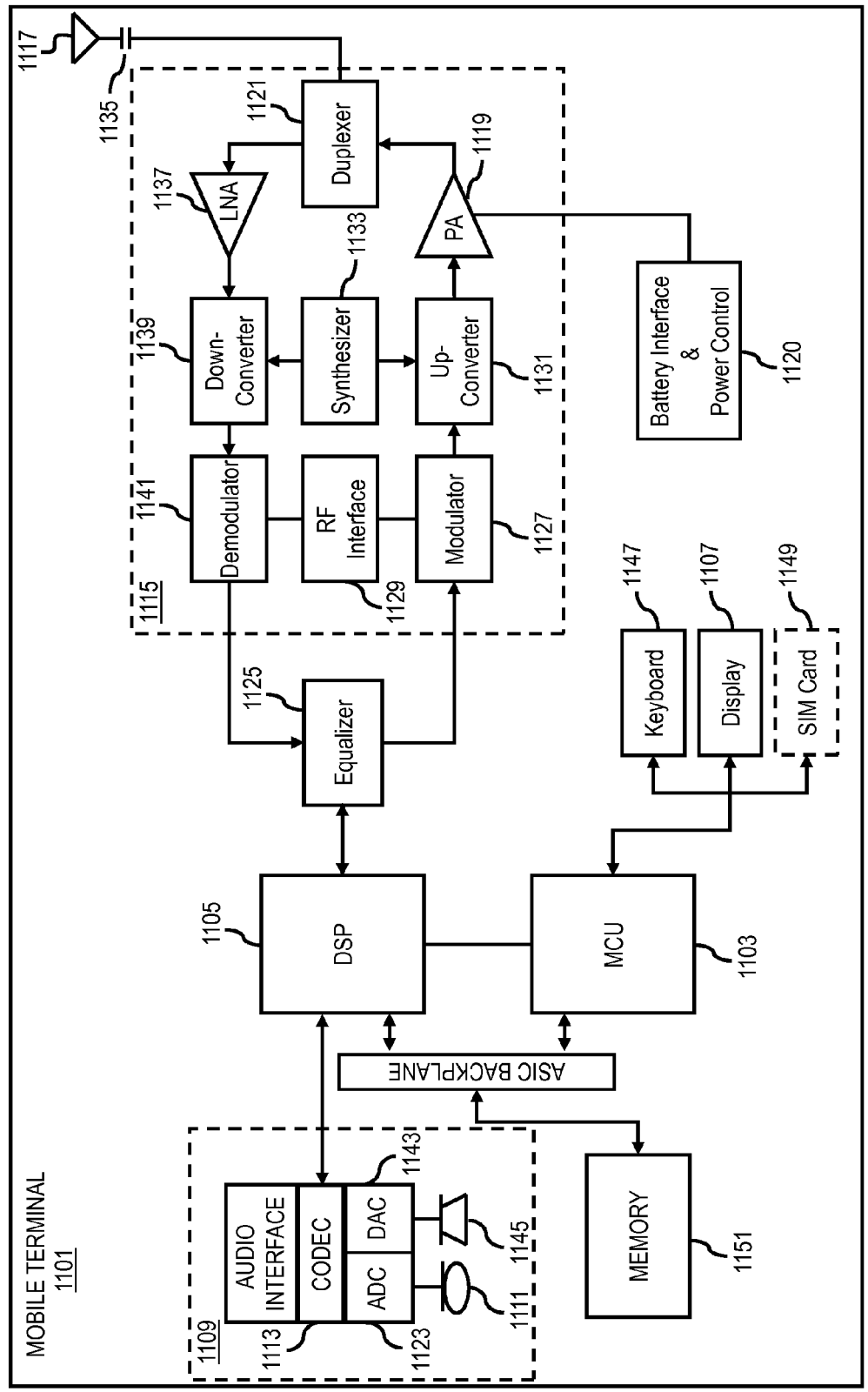
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing abstracted user models in accordance with one or more access policies. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing abstracted user models in accordance with one or more access policies. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide abstracted user models in accordance with one or more access policies. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network.

The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    an ontology for specifying a hierarchy of one or more abstraction levels for items data used in latent factorization models;
    a generation, by at least one processor implemented in hardware, of one or more user models for the items data corresponding to each abstraction level of the ontology;
    a processing of at least one request for one or more recommendations (a) to determine a requested abstraction level, and (b) to determine a privacy level, a security level, or a combination thereof associated with the at least one request;
    a processing of the privacy level, the security level, or the combination thereof against one or more privacy policies, one or more security policies, or a combination thereof to determine permission to access the requested abstraction level;
    a generation, a retrieval, or a combination thereof of the at least one of the one or more user models based, at least in part, on whether the at least one of the one or more user models exists at the requested abstraction level,
    a selection of at least one of the one or more user models for generating the one or more recommendations for one or more applications, one or more services, or a combination thereof based, at least in part, on the one or more privacy policies, the one or more security policies, or the combination thereof; and
    wherein the one or more abstraction levels correspond to different levels of the privacy policies and the security policies of the one or more user models.

2. A method of claim 1, wherein the (1) data and/or (2) information and/or (3) at least one signal are further based, at least in part, on the following:
    user interaction information, ratings information, context information, or a combination thereof associated with the at least one device, the at least one user of the at least one device, or a combination thereof; and
    a processing of the user interaction information, the ratings information, the context information, or the combination based, at least in part, on the ontology to generate the one or more user models for the one or more abstraction levels.

3. A method of claim 1, wherein the (1) data and/or (2) information and/or (3) at least one signal are further based, at least in part, on the following:
    a processing of the at least one request to determine a requested segment of the selected at least one user model; and
    a generation, a retrieval, or a combination thereof of the requested segment based, at least in part, on whether the requested segment exists.

4. A method of claim 3, wherein the at least one request includes at least one domain associated with the one or more recommendations, and the requested segment is associated with the at least one domain.

5. A method of claim 1, wherein the (1) data and/or (2) information and/or (3) at least one signal are further based, at least in part, on the following:
- if permission is not granted, at least one other abstraction level at which permission is granted based, at least in part, on the one or more privacy policies, the one or more security policies, or the combination thereof; and
- a notification of the at least one other abstraction level, a generation, a retrieval, or a combination thereof of at least one other user model for the at least one other abstraction level, or a combination thereof.

6. A method of claim 1, wherein the privacy level, the security level, or the combination thereof is based, at least in part, on an originating location of the at least one request, a location of the one or more applications, a location of the one or more services, or a combination thereof.

7. A method of claim 1, wherein the (1) data and/or (2) information and/or (3) at least one signal are further based, at least in part, on the following:
- a generation, a retrieval, or a combination thereof of one or more item models associated with the one or more abstraction levels; and
- a selection of at least one of the one or more item models for generating the one or more recommendations based, at least in part, on the one or more privacy policies, the one or more security policies, the selected at least one user model, the requested abstraction level, or a combination thereof.

8. A method of claim 7, wherein the (1) data and/or (2) information and/or (3) at least one signal are further based, at least in part, on the following:
- a processing of the selected at least one user model, the selected at least one item model, or a combination thereof to generate ratings data for generating the one or more recommendations.

9. A method of claim 1, wherein the selection of at least one of the one or more user models for generating one or more recommendations for one or more applications, one or more services, or a combination thereof is based, at least in part, on one or more security policies.

10. An apparatus comprising:
- at least one processor; and
- at least one memory including computer program code for one or more programs,
- the at least one memory and the computer program code configured to, with the at least one processor, cause the apparatus to perform at least the following,
- determine an ontology for specifying a hierarchy of one or more abstraction levels for items data used in latent factorization models;
- generate one or more user models for the items data corresponding to each abstraction level of the ontology;
- process at least one request for one or more recommendations (a) to determine a requested abstraction level, and (b) to determine a privacy level, a security level, or a combination thereof associated with the at least one request;
- process the privacy level, the security level, or the combination thereof against one or more privacy policies, one or more security policies, or a combination thereof to determine permission to access the requested abstraction level;
- generate and/or retrieve the at least one of the one or more user models based, at least in part, on whether the at least one of the one or more user models exists at the requested abstraction level,
- select at least one of the one or more user models for generating the one or more recommendations for one or more applications, one or more services, or a combination thereof based, at least in part, on the one or more privacy policies, the one or more security policies, or the combination thereof; and
- wherein the one or more abstraction levels correspond to different levels of the privacy policies and the security policies of the one or more user models.

11. An apparatus of claim 10, wherein the apparatus is further caused to:
- determine user interaction information, ratings information, context information, or a combination thereof associated with the at least one device, the at least one user of the at least one device, or a combination thereof; and
- process the user interaction information, the ratings information, the context information, or the combination based, at least in part, on the ontology to generate the one or more user models for the one or more abstraction levels.

12. An apparatus of claim 10, wherein the apparatus is further caused to:
- process the at least one request to determine a requested segment of the selected at least one user model; and
- generate and/or retrieve the requested segment based, at least in part, on whether the requested segment exists.

13. An apparatus of claim 12, wherein the at least one request includes at least one domain associated with the one or more recommendations, and the requested segment is associated with the at least one domain.

14. An apparatus of claim 10, wherein the apparatus is further caused to:
- determine, if permission is not granted, at least one other abstraction level at which permission is granted based, at least in part, on the one or more privacy policies, the one or more security policies, or the combination thereof; and
- cause, at least in part, a notification of the at least one other abstraction level, generate and/or retrieve at least one other user model for the at least one other abstraction level, or a combination thereof.

15. An apparatus of claim 10, wherein the privacy level, the security level, or the combination thereof is based, at least in part, on an originating location of the at least one request, a location of the one or more applications, a location of the one or more services, or a combination thereof.

16. An apparatus of claim 10, wherein the apparatus is further caused to:
- generate and/or retrieve one or more item models associated with the one or more abstraction levels; and
- select at least one of the one or more item models for generating the one or more recommendations based, at least in part, on the one or more privacy policies, the one or more security policies, the selected at least one user model, the requested abstraction level, or a combination thereof.

17. An apparatus of claim 16, wherein the apparatus is further caused to:
- process the selected at least one user model, the selected at least one item model, or a combination thereof to generate ratings data for generating the one or more recommendations.

18. An apparatus of claim 10, wherein the selection of at least one of the one or more user models for generating one or more recommendations for one or more applications, one or more services, or a combination thereof is based, at least in part, on one or more security policies.

* * * * *